United States Patent [19]

Nelles et al.

[11] Patent Number: 4,923,293

[45] Date of Patent: May 8, 1990

[54] OPTICAL SYSTEM FOR MASKING OUT A COMPONENT REGION OF AN IMAGE

[75] Inventors: Bruno Nelles, Oberkochen; Rainer Schwenn, Katlenburg-Lindau, both of Fed. Rep. of Germany

[73] Assignee: Carl-Zeiss-Stiftung, Heidenheim

[21] Appl. No.: 301,601

[22] Filed: Jan. 26, 1989

[30] Foreign Application Priority Data

Feb. 13, 1988 [DE] Fed. Rep. of Germany ....... 3804534

[51] Int. Cl.$^5$ ..................... G02B 23/00; G02B 23/10; G02B 17/00
[52] U.S. Cl. .................................. 350/503; 350/537; 350/321
[58] Field of Search ............... 350/504, 505, 503, 321, 350/537

[56] References Cited

U.S. PATENT DOCUMENTS 3,752,559  8/1973  Fletcher et al. ..................... 350/505

FOREIGN PATENT DOCUMENTS 2615002  6/1987  France .................. 350/537

Primary Examiner—Bruce Y. Arnold
Assistant Examiner—David R. Parsons
Attorney, Agent, or Firm—Walter Ottesen

[57] ABSTRACT

The invention relates to an optical system wherein a masking arrangement removes a component region from an overall region to be viewed while minimizing stray radiation. The improvement afforded by the optical system of the invention is provided by two measures which augment each other in an advantageous manner. The first measure is the use of a component masking arrangement wherein the masked out component region is directed onto a mirror. The second measure is provided by focusing the entering beam with a mirror onto the masking arrangement for masking out the component region. With the controlled removal of the component region, the masked out component region as well as the remaining region can be viewed simultaneously. After an intensity adaptation of one region, which can be carried out if required, both regions can be joined again to a total region.

12 Claims, 2 Drawing Sheets

OPTICAL SYSTEM FOR MASKING OUT A COMPONENT REGION OF AN IMAGE

FIELD OF THE INVENTION

The invention relates to an optical system for imaging an object while masking out a predetermined component region thereof.

BACKGROUND OF THE INVENTION

Optical instruments of the kind wherein a component region is masked in order that the remaining region can be seen with greater clarity are found in many areas. The masking is especially important where an intense self-radiator is present which blankets non-masked weaker radiating peripheral regions. This problem is especially significant in coronagraphs with which the corona of the sun is viewed.

The masking out of component regions as such has been utilized for a long time. However, in known apparatus, lenses are used ahead of the location where the masking is done and occult discs are utilized for masking. However, if very low luminescence is to be viewed adjacent intense radiators, very high requirements must be imposed on the imaging system with respect to a low stray radiation. Individual lenses, however, lead to a deterioration of the imaging because of known lens aberrations.

The lens aberrations can be minimized by utilizing several lenses. However, this leads to a reduction in light in dependence upon the number of lenses because of the lens material and to an increase in the stray radiation caused by the surface roughness of each lens. These conditions together effect a reduction of the overall contrast. Accordingly, with lens systems, either a good image is obtained or little stray radiation.

The use of occulting discs is a second disturbing factor which together with the utilization of lenses limits the minimization of stray radiation.

Coronagraphs belong to those apparatus which impose the highest requirements with respect to the foregoing. With coronagraphs, the masking out of the central region has up to now been achieved with a mirrored occult disc on a field lens. However, since a lens generates stray radiation at two surfaces and in its interior, limits are here imposed on the reduction of stray light.

SUMMARY OF THE INVENTION

It is an object of the invention to mask a portion of the observing region to be viewed while minimizing stray light and especially from the region to be masked.

The optical system according to the invention images an object while masking out a predetermined portion. The optical system of the invention includes: first mirror means receiving the object radiation coming from the object and forming an intermediate image defining an intermediate image plane; second mirror means mounted in the intermediate image plane; masking means formed in the second mirror means for masking out a component region of the intermediate image and leaving a remainder portion which is reflected at the second mirror means; and, a system component mounted downstream of the second mirror means for forming an image of the remainder portion.

The invention comprises essentially two measures which advantageously complement each other. The first measure is the use of a masking arrangement for masking out a component region which is mounted on a mirror. The second measure involves focusing the entering beam by means of a mirror onto the masking arrangement for masking out the component region.

The masking arrangement for masking the component region can be realized as an opening or bore, occult disc, deflecting mirror or with another element functioning in the same way.

The system component mounted downstream is for manipulating the beam and can, for example, comprise a lens or a mirror.

Each of the above measures can be used by itself and has in its own right advantages with respect to known systems having an arrangement for masking component regions. For example, the component region masking means on the mirror can also be a second thermally decoupled mirror which reflects the component region to be masked into a separate beam path. However, this has the disadvantage that a minimal stray radiation can occur at this reflecting component region masking device because of surface defects such as roughness and the like.

The focusing of the incident beam can, for example, be achieved by means of a lens but a certain component of stray radiation can not be avoided. Only the connection of the two above-mentioned measures in a system leads to the result that the disadvantages do not occur which would occur if these measures were used individually.

The minimization of stray radiation by masking can be achieved by using an opening. This opening is disposed on a body which is optically effective and on which the incident beam is focused. This opening is disposed at a location which would affect the component region to be masked normally in way like the region not to be masked out.

By means of the opening which can be a hole or bore, the component region which is to be masked out is not operated on optically in contrast to the remainder of the input beam so that a separation of the component of the entering beam to be masked out from the remainder of the beam to be imaged is achieved with a minimum of stray radiation. This is above all the case because a more radiation intensive beam component, which is to be masked out, remains optically uninfluenced while being masked out. This is the salient contrast to the arrangements which were previously used for masking out component regions and which, for masking out, have also optically influenced components of more intense radiation.

A further important advantage achieved in masking out a component region by means of an opening is that no thermal influences act on the imaging system in the form of local heating when masking out a component region from an intense radiator.

In an especially advantageous embodiment, the component region which is masked out by being passed through the opening is brought to an image in an optical system located beyond the opening so that, in a single apparatus, the masked out component region as well as the component region which is not masked out can be imaged. In this way, the possibility is provided for the first time that after an amplification or attenuation of one of the component regions, both component regions can later be imaged as a total region. However, also other images can be advantageously faded into the masked out component region. These can be characterizing data fields as well as, for example, the masked out component region greatly reduced in radiation intensity.

The minimization of stray light when masking out occurs in an advantageous manner by means of masking out a component region at a mirror. The beam path limited by an entry diaphragm is focused in the direction toward the mirror. The component region is then masked out at the mirror with the beam path which is not masked out being reflected in a direction in which it can be used for further imaging.

By masking out a component region at the mirror, the great advantage is obtained that the reflected component of the radiation which is to be imaged can be deflected in such a way that a minimization of stray light is possible in a simple manner.

The minimization of stray light when masking out occurs through the use of a mirror as an input objective. This construction permits the stray radiation, which occurs at all optically effective surfaces, to be minimized in that only one optically effective surface focuses the entering beam in the direction toward the arrangement for masking out a component region. The optically effective surface is a highly polished mirror surface and therefore produces little stray light. In this way and compared to the use of a lens, the second imaging surface with its surface roughness and with its surface contamination which may be present is avoided, as well as the unavoidable influence of volume effects (non-homogeneousness, tensions, bubbles, inclusions, faults, browning, et cetera) caused by the lens material.

An optimization is obtained by means of this invention for minimizing stray radiation when masking out a component region and, in this way, very good conditions for observing regions of attenuated light are obtained which would not be visible without masking out the light-intense regions.

In contrast to the known lens systems or individual lenses, especially the use of mirrors provides for a high transmission and thereby simultaneously avoids chromatic aberrations.

In order to obtain a precise masking out, the region to be masked out must be focused and positioned on the device for masking out the component beam. For this purpose, it is advantageous to be able to carry out a position change with one of the mirrors (a three-axis movement, two-axis movement or one-axis movement with one movement changing the distance parallel to the optical axis).

The invention is described in the following in the context of an example of a coronagraph. Coronagraphs are optical instruments with which it is possible to observe the low light intensity corona blanketed by the sunlight. The essential task to be performed with such an instrument is the suppression of the stray light which, on the one hand, occurs at all surfaces and, on the other hand, occurs also at all edges in the beam path and therefore, for example, at the entrance pupil.

The advantage of the invention becomes especially significant with a comparison to available coronagraphs wherein a lens objective generates an image of the sun and projects it on a small mirrored occult disc on a field lens with the disc diameter corresponding to the diameter of the image of the sun.

By using a lens as an input objective, two optically effective surfaces and one optically through-radiated body operate on the entering beam ahead of the device for masking out a component region. Both optically effective surfaces can have surface contamination such as scratches and polishing fissures et cetera which, in addition to the remainder of the surface roughness produced during processing contribute to generating stray radiation. Furthermore, volume effects (inhomogeneousness, bubbles, fissures, browning, fluorescence, et cetera) lead to a further increase of the stray radiation.

Before the image generated by the objective is optically influenced by the field lens, the image of the sun generated by the objective is projected onto a small mirrored occult disc which is attached to the field lens. The occult disc has a size which is so dimensioned that the sunlight is completely masked out. As a rule, the occult disc must be dimensioned so that it is somewhat larger than the sun image. The bright image of the sun disc is reflected by this occult disc onto the wall of the tube which is so configured that as little stray radiation as possible is generated. The occult disc becomes heated notwithstanding its very good mirroring relative to the field lens so that by means of the attachment of the occult disc to the field lens, thermally conditioned tensions occur because of the attachment as well as because of the thermal flow from the center of the lens to the edge. Since this is a dynamic, time-dependent change of the lens, these image deteriorating occurrences cannot be considered in the computations for the construction.

The heating of the intermediate space between the objective and the field lens caused by the destruction of the main beam portion on the tube wall acts in the same direction. However, a portion of the bright image of the sun disc is also reflected in the direction toward the objective where it generates stray radiation at the optical surfaces and because of the volume effects in the optically effective body in the direction of the field lens. Furthermore, a minimal residual portion from the wall of the tube is scattered in the direction toward the field lens and onto the objective with the latter again generating stray radiation at optical surfaces and in optically acting bodies. These multiple reflections reduce the contrast and thereby the quality of the image.

The advantages of the invention can be advantageously realized in an aplanatic mirror system (fulfilling the sinus condition) whereby a coma freedom in an image field of almost 3° can be obtained.

In an especially advantageous embodiment, the radii of the mirrors used are of the same magnitude in a three-mirror system. Primary and collimating mirrors are then part of an imagined large one-piece mirror of which only the component regions utilized are really present. In this way, the mirror coronagraph can be realized by rebuilding presently available mirror telescopes.

Advantageously, the diaphragm diameter and/or the location of the diaphragms on the optical axis can be adjusted.

Correction systems must be provided for a larger aperture angle. This can be provided advantageously by means of a Schmidt plate such as a Schmidt mirror. However, the correction also can be provided behind the exit pupil in a further mirror telescope utilized as an objective with telescopes of the Richey-Chretien type being especially suitable. However, for correcting imaging errors, a correction system of lenses can be provided behind the exit pupil and/or behind the mirror telescope since, after masking out the main beam source, the generation of stray radiation has little influence.

For analyzing purposes, at least one optically effective body for changing the spectral composition can be advantageously provided ahead of and/or after the exit pupil in the beam path.

In a three-mirror system, the deflector for deflecting out the component beam can be provided advantageously on the secondary mirror since a very precise masking out of a component region can be provided here.

The imaging is advantageously achieved from infinity to infinity with a real image of the entrance diaphragm on the exit diaphragm for a small aperture angle. In this connection, it is advantageous if the diameter of the exit diaphragm corresponds at most to the diameter of the image of the entrance diaphragm. The diameter of the exit diaphragm is advantageously so dimensioned that the stray light originating at the edge of the entrance diaphragm is removed in every instance. An optimization of the apparatus for different applications is then possible when the diaphragm diameter and/or the location of the diaphragm is changeable on the optical axis.

It is especially advantageous if, after the removal of a component region, a parallel beam path is provided for some optical and spectroscopic investigations.

With this invention, one can however not only observe the sun corona; instead, also stars in specific celestial regions can be masked out in order to make weak radiating bodies in their surroundings more visible.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
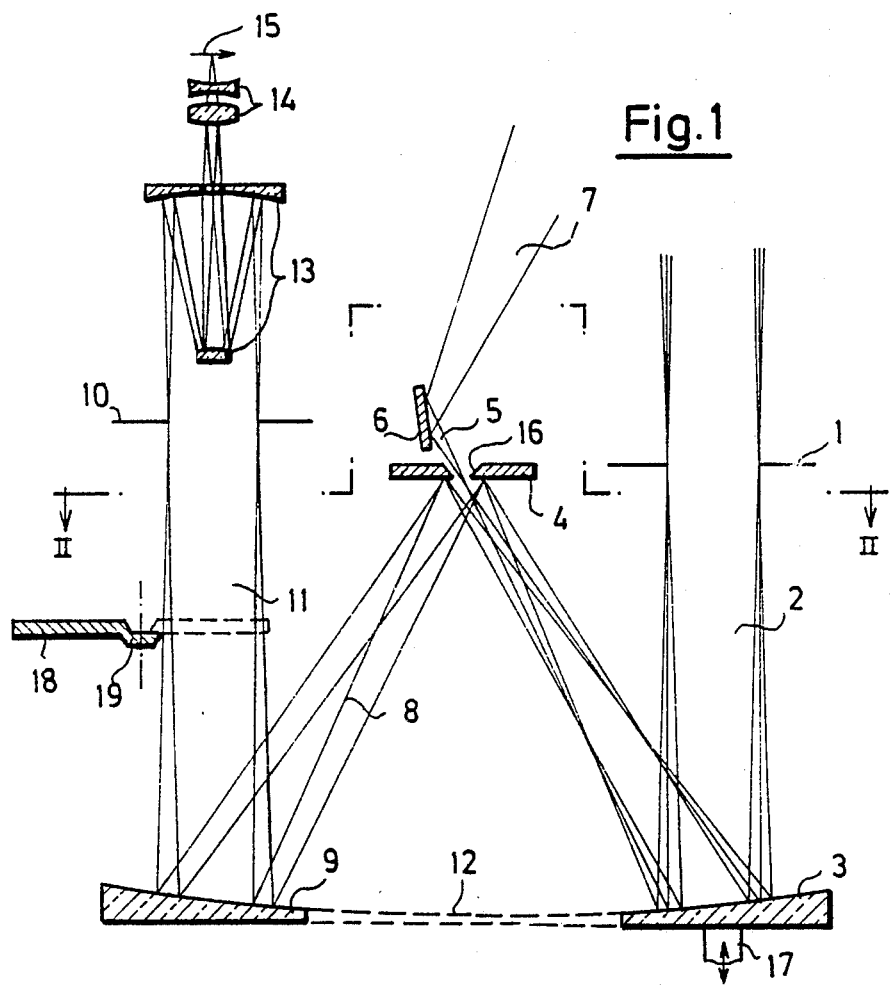
FIG. 1 is a schematic showing the beam path in a mirror coronagraph according to an embodiment of the invention.
Figure 2:
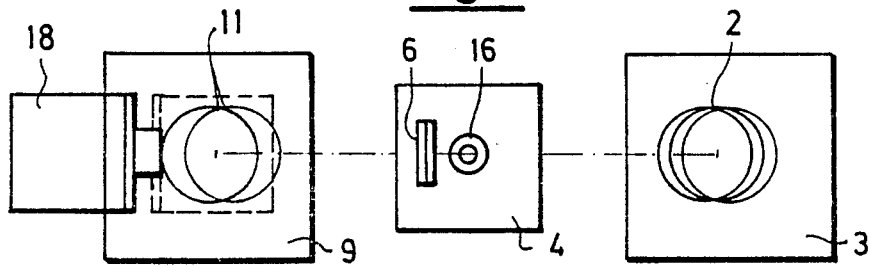
FIG. 2 is a lateral view of a portion of the coronagraph of FIG. 1.

A mirror coronagraph is schematically illustrated in FIGS. 1 and 2. After passing the entrance pupil 1, the entering parallel beam 2 impinges on a highly polished primary mirror 3 which produces little stray light. A first real image is formed on the secondary mirror 4 which has an opening 16 formed in the center region thereof. The opening 16 has the magnitude corresponding to the image of the sun. The sunlight 5 to be eliminated is removed from the instrument in the form of a beam 7 by means of a flat mirror 6 arranged in a suitable manner behind secondary mirror 4. In contrast, the image of the corona contained in the beam from which the component region was removed 11 is imaged at infinity by means of the collimating mirror 9.

The two-mirror system 13 is here configured as a mirror telescope according to Richey-Chretien. Between the collimating mirror 9 and the two-mirror system 13, a second real intermediate image of the inlet pupil 1 is formed which is freed from the stray light of the bending at the edge of the inlet pupil 1 by means of an outlet pupil 10. The two-mirror system 13 functions as a camera objective. After this two-mirror system 13, the rays reach the detector 15 after passing through a lens-correction system 14.

As shown in FIG. 1, the primary mirror 3 and the collimating mirror 9 can be parts of a large primary mirror 12. In their respective forms, both mirrors (3, 9) are extra-axially parabolic and are complementary to one another.

A lens coronagraph provides only a very poor image with white light. In contrast to a lens coronagraph, the mirror coronagraph according to the invention can be used as a white light coronagraph as well as a monochromatic coronagraph for high spectral purity. The apparatus according to the invention is distinguished by the provision of a parallel light bundle having exceedingly low angular errors in the beam path. Furthermore, the stray light component is minimal since only a mirror surface 3 is utilized ahead of the device for masking out the sun. The amount of bending contributed by the entry pupil 1 is eliminated at the exit pupil 10 since the system data is so determined that a real image of the entry pupil 1 is formed.

An elimination of the optical residual errors of the masking system is achieved by the suitably configured two-mirror system 13 arranged after the masking system (1, 3, 4 with 6, 9 and 10).

The necessary fine adjustment of the masking system can be effected by means of a positional change 17 of the primary mirror 3.

A change of the spectral composition can be achieved with a filter 18 which is pivoted into the beam path via a pivot joint 19.

Figure 3:
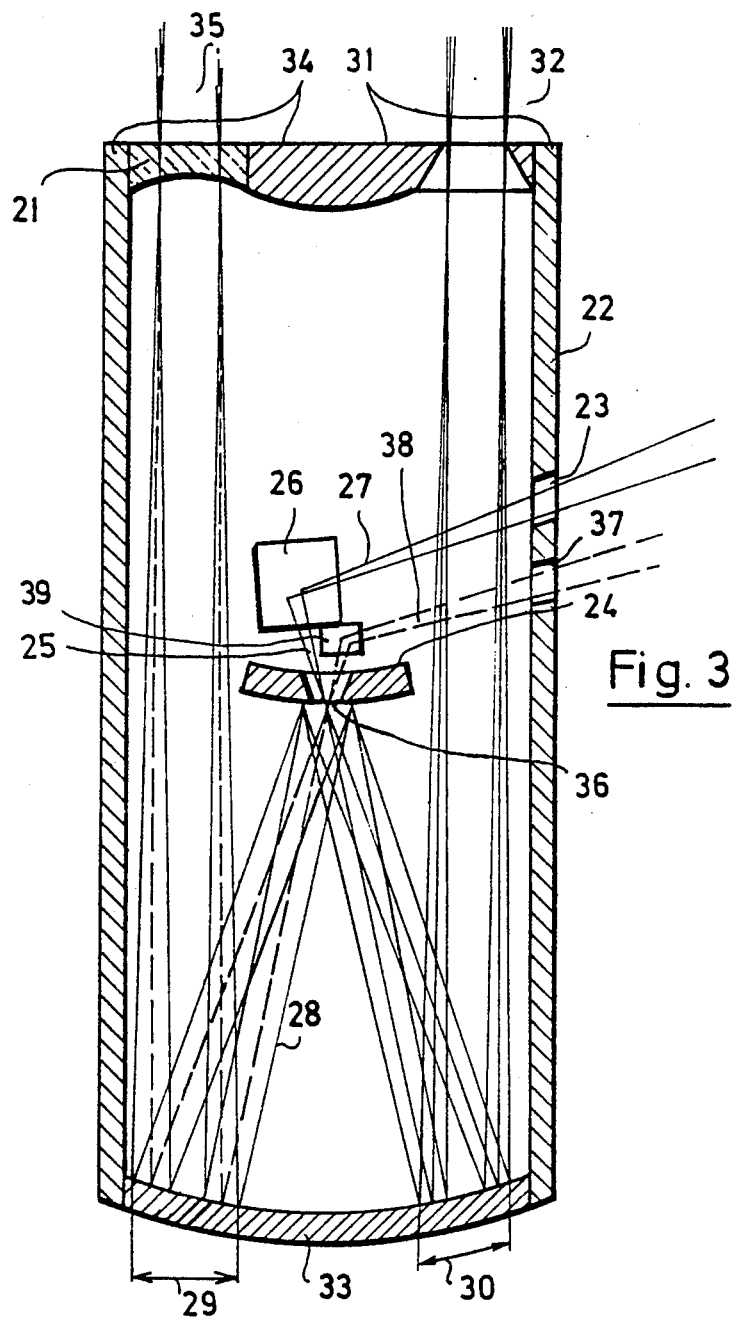
FIG. 3 is a schematic of a coronagraph according to another embodiment of the invention and having a large opening ratio.

A coronagraph equipped with a Schmidt plate 21 is shown in FIG. 3. This embodiment permits viewing with a large aperture angle. The incident beam 32 is here too limited by means of a diaphragm 31 in the form of a beam entry window. The entire apparatus is disposed inside an enclosing casing 22 which has an exit aperture 23 only for the deflected beam 27 which has been masked out. The incident beam 32 is deflected at the rear mirror 33 in region 30 in the direction of the masking mirror 24. Two beams (25, 28) are present after reflection at the masking mirror 24 having the opening 36. The beam 25 which has been removed is deflected as beam 27 in the direction toward the exit aperture 23 of the enclosing casing 22. The beam 28 reflected at the masking mirror 24 is deflected at another region 29 of the rear mirror 33 in a direction toward the exit window 21 having a correction plate. For the beam 27 which has been masked out by passing through opening 36, another beam 38 passing through a beam entry window 37 can be faded in via a fade-in mirror 39. The exit beam 35 made up from the reflected and faded-in beam can be viewed after passing through the exit diaphragm 34.

It is understood that the foregoing description is that of the preferred embodiments of the invention and that various changes and modifications may be made thereto without departing from the spirit and scope of the invention as defined in the appended claims.

What is claimed is:

1. An optical system for imaging an object while masking out a predetermined portion, the optical system comprising:
    first mirror means receiving the object radiation coming from the object and forming an intermediate image defining an intermediate image plane;
    second mirror means mounted in said intermediate image plane;
    masking means formed in said second mirror means for masking out a component region of said intermediate image and leaving a remainder portion which is reflected at said second mirror means; and, a system component mounted downstream of said second mirror means for forming an image of said remainder portion.

2. The optical system of claim 1, said masking means comprising an aperture formed in said second mirror means.

3. The optical system of claim 2, said masking means further comprising a deflecting mirror for deflecting the rays of said component region in a predetermined direction.

4. The optical system of claim 1, comprising third mirror means interposed between said second mirror means and said system component for deflecting the rays of said remainder portion into said system component.

5. The optical system of claim 4, comprising a single main-mirror defining both said first mirror means and said third mirror means.

6. The optical system of claim 5, comprising: an inlet diaphragm interposed between said object and said first mirror means; an outlet diaphragm interposed between said third mirror means and said system component; and, said main mirror being configured for imaging said inlet diaphragm into said outlet diaphragm.

7. The optical system of claim 1, comprising fade-in means for fading a beam into the void left by masking out said component region.

8. The optical system of claim 6, said inlet diaphragm having an edge at which stray light is generated; and, said outlet diaphragm being mounted so as to trim the image of said inlet diaphragm to thereby suppress said stray light.

9. The optical system of claim 4 being an optical telescope comprising: a single main mirror defining both said first mirror means and said third mirror means; and, a secondary mirror defining said second mirror means.

10. The optical system of claim 9, said masking means being a through bore formed in said secondary mirror.

11. The optical system of claim 10 being useable as a coronagraph and said through bore being centered in said secondary mirror.

12. The optical system of claim 9, comprising means for directing the rays of said component region out of said telescope while simultaneously preventing the generation of stray light at further optical surfaces which would be a disturbance to the observation of said remainder portion.

* * * * *